(12) United States Patent
Seki

(10) Patent No.: US 10,810,762 B2
(45) Date of Patent: Oct. 20, 2020

(54) IMAGE PROCESSING APPARATUS

(75) Inventor: Akihito Seki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 554 days.

(21) Appl. No.: 13/164,850

(22) Filed: Jun. 21, 2011

(65) Prior Publication Data

US 2012/0075428 A1 Mar. 29, 2012

(30) Foreign Application Priority Data

Sep. 24, 2010 (JP) ................................ 2010-213575

(51) Int. Cl.
*G06T 7/80* (2017.01)
*H04N 13/239* (2018.01)
*H04N 13/246* (2018.01)
*H04N 13/106* (2018.01)

(52) U.S. Cl.
CPC ............. *G06T 7/85* (2017.01); *H04N 13/106* (2018.05); *H04N 13/239* (2018.05); *H04N 13/246* (2018.05); *G06T 2207/30252* (2013.01)

(58) Field of Classification Search
CPC ... G06T 7/0018; G06T 7/0065; G06T 7/0075; G06T 7/002; G06T 2207/10012; H04N 13/0246; H04N 13/0239; H04N 2013/0081

See application file for complete search history.

(56) References Cited

U.S. PATENT DOCUMENTS

| 5,444,478 | A | * | 8/1995 | Lelong .............. H04N 5/23238 348/38 |
| 6,373,518 | B1 | | 4/2002 | Sogawa |
| 7,023,473 | B2 | * | 4/2006 | Iwai et al. .................... 348/187 |
| 7,106,365 | B1 | * | 9/2006 | Sogawa .................... 348/222.1 |
| 8,072,654 | B2 | * | 12/2011 | Lefevere ...................... 358/474 |
| 2002/0159616 | A1 | * | 10/2002 | Ohta .................. G06K 9/00798 382/104 |

(Continued)

FOREIGN PATENT DOCUMENTS

| JP | 11-055538 | 2/1999 |
| JP | 11-325889 | 11/1999 |

(Continued)

OTHER PUBLICATIONS

English Translation of Office Action of Decision of Rejection for Japanese Application No. 2010-213575 dated Feb. 5, 2013, 4 pgs.

(Continued)

*Primary Examiner* — Rebecca A Volentine
(74) *Attorney, Agent, or Firm* — Amin, Turocy & Watson, LLP

(57) ABSTRACT

According to one embodiment, an image processing apparatus includes plural imaging units and a calibration unit. The imaging units capture an overlapping region. The calibration unit calibrates plural captured images and obtains plural calibrated images in which lens distortion in each of the captured images is corrected and corresponding positions of the captured images are aligned with each other horizontally and are adjusted to a surface perpendicular to a plane. The plural imaging units are arranged such that a baseline vector connecting optical centers of the imaging units is perpendicular to a normal vector of the plane.

12 Claims, 12 Drawing Sheets

(56) References Cited

U.S. PATENT DOCUMENTS

| | | | | |
|---|---|---|---|---|
| 2002/0196423 | A1* | 12/2002 | Shima | B60T 7/22 |
| | | | | 356/3.14 |
| 2004/0233280 | A1* | 11/2004 | Aoyama | 348/135 |
| 2005/0062615 | A1* | 3/2005 | Braeuchle et al. | 340/903 |
| 2005/0237385 | A1* | 10/2005 | Kosaka | G01B 11/00 |
| | | | | 348/42 |
| 2006/0013438 | A1* | 1/2006 | Kubota | B60W 40/04 |
| | | | | 382/103 |
| 2006/0018509 | A1* | 1/2006 | Miyoshi | G06T 5/006 |
| | | | | 382/104 |
| 2006/0050338 | A1* | 3/2006 | Hattori | 359/9 |
| 2006/0072788 | A1* | 4/2006 | Suzuki | G01C 11/02 |
| | | | | 382/103 |
| 2006/0083421 | A1* | 4/2006 | Weiguo et al. | 382/154 |
| 2007/0291125 | A1* | 12/2007 | Marquet | 348/207.99 |
| 2008/0088707 | A1* | 4/2008 | Iwaki | G01S 13/931 |
| | | | | 348/208.1 |
| 2008/0181488 | A1* | 7/2008 | Ishii et al. | 382/154 |
| 2008/0253606 | A1* | 10/2008 | Fujimaki | G08G 1/161 |
| | | | | 382/100 |
| 2008/0309763 | A1* | 12/2008 | Hongo | B60R 1/00 |
| | | | | 348/148 |
| 2009/0179773 | A1* | 7/2009 | Denny | G06T 7/0018 |
| | | | | 340/901 |
| 2010/0103264 | A1* | 4/2010 | Nagao | B60R 1/00 |
| | | | | 348/148 |
| 2010/0134600 | A1* | 6/2010 | McKeon et al. | 348/48 |
| 2010/0150455 | A1 | 6/2010 | Oyama | |
| 2011/0025828 | A1* | 2/2011 | Ishiyama | 348/47 |
| 2011/0032374 | A1* | 2/2011 | Imanishi | B60R 1/00 |
| | | | | 348/222.1 |

FOREIGN PATENT DOCUMENTS

| | | |
|---|---|---|
| JP | 2003-303337 | 10/2003 |
| JP | 2004-222076 | 8/2004 |
| JP | 2005-045338 | 2/2005 |
| JP | 2006-078793 | 3/2006 |
| JP | 2006-121432 | 5/2006 |
| JP | 2008-102620 | 5/2008 |
| JP | 2008-524673 | 7/2008 |
| JP | 2010-166205 | 7/2010 |
| JP | 2001-101415 | 4/2011 |
| WO | 2009/101798 A1 | 8/2009 |

OTHER PUBLICATIONS

Fusiello. A., et al., "A compact algorithm for rectification of stereo pairs", Machine Vision and Applications (2000) 12: pp. 16-22.

Japanese Office Action for Japanese Patent Application No. 2010-213575 dated Jul. 9, 2013.

Japanese Office Action for Japanese Application No. 2010-213575 dated Jul. 10, 2012.

Japanese Office Action for Japanese Patent Application No. 2013-095499 dated Mar. 11, 2014. Translated to English by USPTO Global Dossier on Mar. 24, 2016. Dictionary last updated Feb. 2, 2016.

Japanese Office Action for Japanese Patent Application No. 2013-095499 dated Aug. 12, 2014. Translated to English by USPTO Global Dossier on Mar. 24, 2016. Dictionary last updated Feb. 2, 2016.

Gou et al., "Three-Dimensional Vision", Kyoritsu Shuppan Co., Ltd., Japan, Apr. 20, 1998, pp. 95-99.

* cited by examiner

IMAGE PROCESSING APPARATUS

CROSS-REFERENCE TO RELATED APPLICATIONS

This application is based upon and claims the benefit of priority from Japanese Patent Application No. 2010-213575, filed on Sep. 24, 2010; the entire contents of which are incorporated herein by reference.

FIELD

Embodiments described herein relate generally to an image processing apparatus.

BACKGROUND

Conventionally, a technique is known in which a 3D image is generated such that a human being can recognize the 3D image three-dimensionally using two images (stereo images) captured by two cameras (stereo cameras) having different viewpoints and arranged on the left and right. In order to generate the 3D image, it is necessary to align corresponding positions of the two images with each other horizontally. For this reason, in the above-described technique, image conversion (hereinafter, called parallelization conversion) is carried out such that epipolar lines of the two images are in parallel and have the same height, thereby generating a 3D image. An epipolar line refers to a line uniquely determined when a line, which connects a target point of one camera and an optical center, is projected onto the other camera. The target point of one camera is projected onto a point on the line uniquely determined in the other camera.

Conventionally, a technique is also known which removes distortion of an image captured by a camera having a wide-angle lens with a field angle wider than that of a typical lens. This camera is used in, for example, a rearview camera of a vehicle or the like. Since the camera is generally used to capture an image of an adjacent object, in many cases, the camera is fixed with a depression angle. As a result, even when lens distortion is removed from the captured image, an object which actually stands vertically in a space may not be projected vertically. For this reason, in the above-described technique, image conversion (hereinafter, called verticalization conversion) is carried out such that an object in an image is verticalized with respect to a plane, removing image distortion.

However, if both the verticalization conversion and the parallelization conversion are carried out, usually, the conversion of one of them is not maintained.

DETAILED DESCRIPTION

In general, according to one embodiment, an image processing apparatus includes plural imaging units and a calibration unit. The imaging units capture an overlapping region. The calibration unit calibrates plural captured images and obtains plural calibrated images in which lens distortion in each of the captured images is corrected and corresponding positions of the captured images are aligned with each other horizontally and are adjusted to a surface perpendicular to a plane. The plural imaging units are arranged such that a baseline vector connecting optical centers of the imaging units is perpendicular to a normal vector of the plane.

Hereinafter, an embodiment of an image processing apparatus will be described in detail with reference to the accompanying drawings. Although in the following embodiment, an example will be described where two imaging units are provided, the number of imaging units is not limited thereto. For example, two or more imaging units may be provided.

Figure 1:
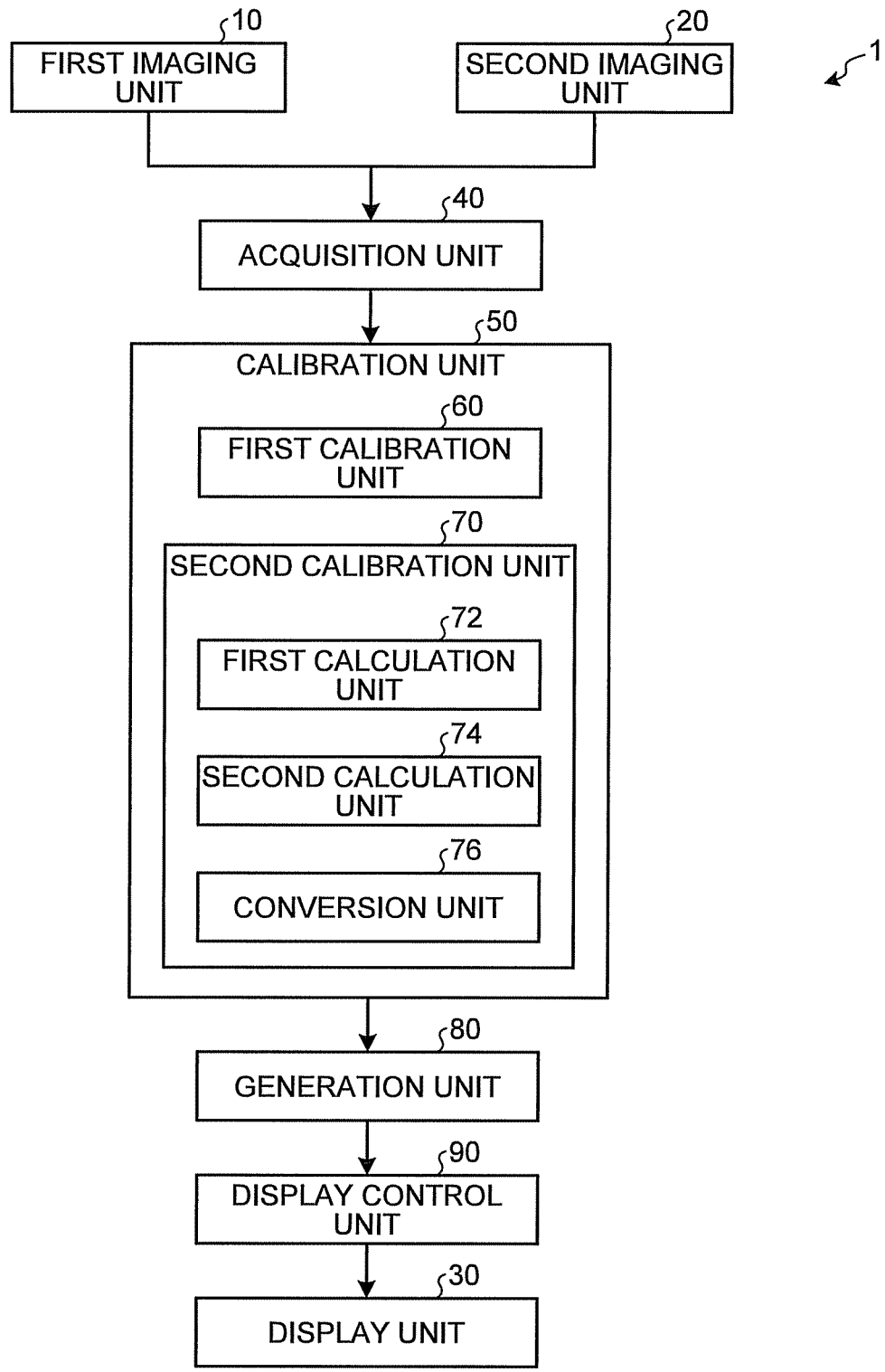
FIG. 1 is a block diagram showing a configuration example of an image processing apparatus according to an embodiment.

FIG. 1 is a block diagram showing a configuration example of an image processing apparatus 1 according to this embodiment. As shown in FIG. 1, the image processing apparatus 1 includes a first imaging unit 10, a second imaging unit 20, a display unit 30, an acquisition unit 40, a calibration unit 50, a generation unit 80, and a display control unit 90.

The first imaging unit 10 and the second imaging unit 20 are arranged such that a baseline vector connecting optical centers of the first imaging unit 10 and the second imaging unit 20 is perpendicular to a normal vector of a plane, and capture an overlapping region. Although in this embodiment, an example will be described where each of the first imaging unit 10 and the second imaging unit 20 is a wide-angle camera which captures a wide-angle image, the imaging unit is not limited thereto. Each of the first imaging unit 10 and the second imaging unit 20 may have a field angle equal to or greater than 100 degrees, for example.

Figure 2:
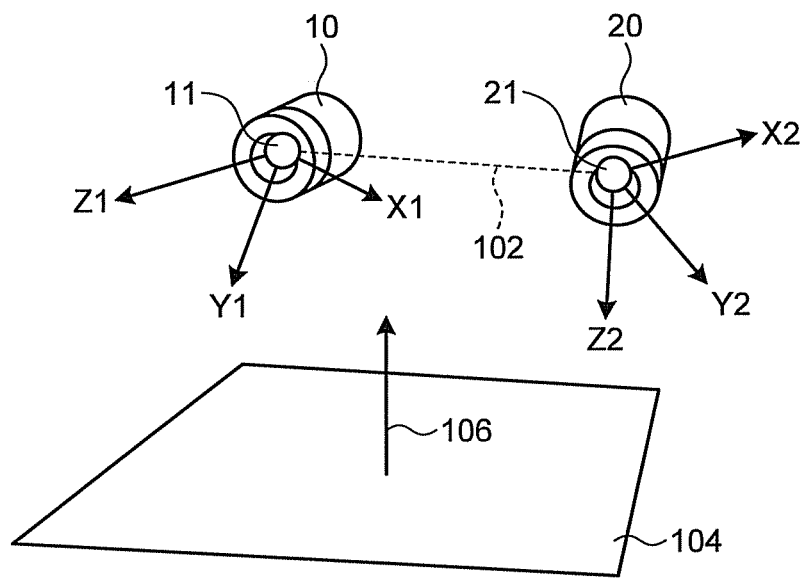
FIG. 2 is an explanatory view illustrating an example of an arrangement method of first and second imaging units in the embodiment.

FIG. 2 is an explanatory view showing an example of an arrangement method of the first imaging unit 10 and the second imaging unit 20. The X1 axis, the Y1 axis, and the Z1 axis are the axes which represent the camera coordinate system of the first imaging unit 10, and the X2 axis, the Y2 axis, and the Z2 axis are the axes that represent the camera coordinate system of the second imaging unit 20. Here, an optical center 11 of the first imaging unit 10 is set at the origin of the X1 axis, the Y1 axis, and the Z1 axis, the Z1 axis is set to coincide with the optical axis direction of the first imaging unit 10, and the X1 axis and the Y1 axis are respectively set to be parallel to the lateral direction and the longitudinal direction of the image. Similarly, an optical center 21 of the second imaging unit 20 is set at the origin of the X2 axis, the Y2 axis, and the Z2 axis, the Z2 axis is set to coincide with the optical axis direction of the second imaging unit 20, and the X2 axis and the Y2 axis are respectively set to be parallel to the lateral direction and the longitudinal direction of the image. The first imaging unit 10 and the second imaging unit 20 are arranged such that a baseline vector 102 connecting the optical centers 11 and 21 thereof is perpendicular to a normal vector 106 of a plane 104. That is, the first imaging unit 10 and the second imaging unit 20 are arranged such that the baseline vector 102 is parallel to the plane 104.

Figure 3:
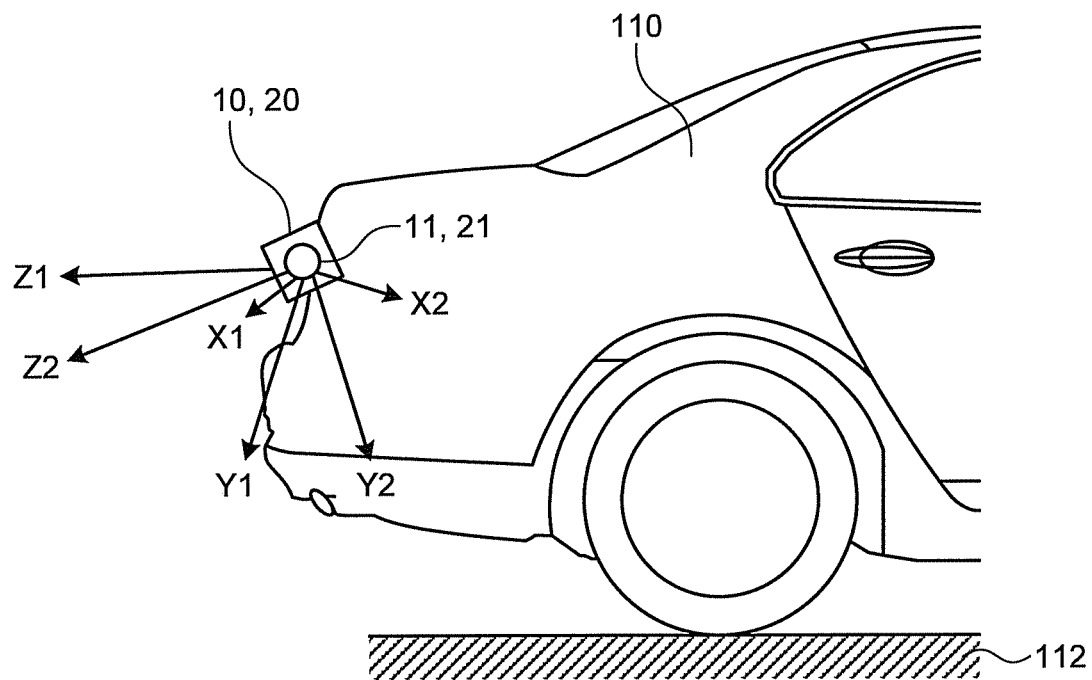
FIG. 3 is an explanatory view illustrating an example of an arrangement method of the first and second imaging units in the embodiment applied to a vehicle.
Figure 4:
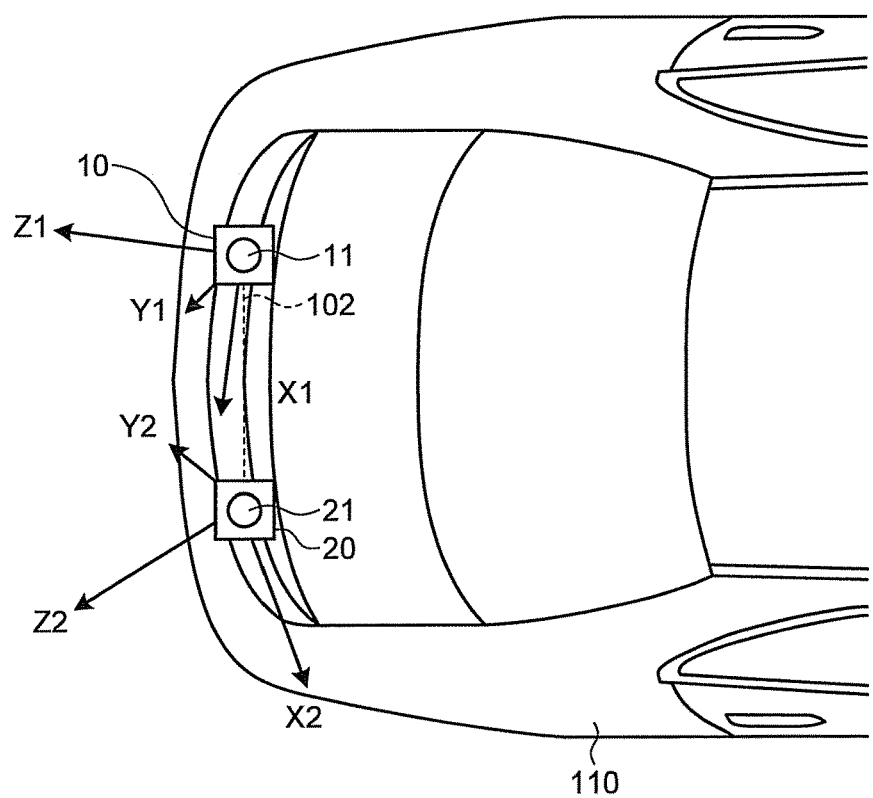
FIG. 4 is an explanatory view illustrating an example of an arrangement method of the first and second imaging units in the embodiment applied to the vehicle.

FIGS. 3 and 4 are explanatory views showing an example of an arrangement method of the first imaging unit 10 and the second imaging unit 20 in a vehicle 110. FIG. 3 shows an example of a front view of the vehicle 110 in which the first imaging unit 10 and the second imaging unit 20 are arranged. FIG. 4 shows an example of a plan view of the vehicle 110 in which the first imaging unit 10 and the second imaging unit 20 are arranged.

As shown in FIGS. 3 and 4, in arranging the first imaging unit 10 and the second imaging unit 20 on the vehicle 110, the first imaging unit 10 and the second imaging unit 20 are arranged such that the baseline vector 102 connecting the optical centers 11 and 21 thereof is parallel to a road surface 112 (corresponding to the plane 104 of FIG. 2) and parallel to the vehicle 110. The first imaging unit 10 and the second imaging unit 20 are arranged (fixed) on the vehicle 110 at a depression angle.

Here, the relationship between the first imaging unit 10 and the second imaging unit 20 arranged on the vehicle 110 and the road surface 112 changes depending on the motion of the vehicle 110 during traveling or the weight of the load on the vehicle. In this embodiment, since the first imaging unit 10 and the second imaging unit 20 are arranged on the vehicle 110 such that the baseline vector 102 is parallel to the vehicle 110, the movement corresponding to pitching of the vehicle 110, which undergoes the maximum change, can become equivalent to the movement with the baseline vector 102 as a rotation axis. For this reason, according to this embodiment, even when the motion of the vehicle 110 or the weight of the load changes, the arrangement condition of the first imaging unit 10 and the second imaging unit 20 can be satisfied.

In this embodiment, since there is no need for parallel stereo arrangement in which the optical axes of the first imaging unit 10 and the second imaging unit 20 coincide with each other in parallel, the first imaging unit 10 and the second imaging unit 20 can be arranged on the vehicle 110 at low cost.

The display unit 30 displays a 3D image which can be three-dimensionally recognized by a human being, and can be realized by a three-dimensional display, such as a liquid crystal display, a plasma display, or an organic EL display, in which a light beam controller, such as a lenticular lens is arranged.

The acquisition unit 40 acquires a stereo image captured by the first imaging unit 10 and the second imaging unit 20. Hereinafter, of the stereo image, an image captured by the first imaging unit 10 is called a right image, and an image captured by the second imaging unit 20 is called a left image.

The calibration unit 50 calibrates the right image and the left image acquired by the acquisition unit 40 and obtains a calibrated right image and a calibrated left image in which lens distortion in each of the right image and the left image is corrected and corresponding positions of the right image and the left image are aligned with each other horizontally and are adjusted to a surface perpendicular to a plane. The calibration unit 50 includes a first calibration unit 60 and a second calibration unit 70.

The first calibration unit 60 calibrates lens distortion in each of the right image and the left image acquired by the acquisition unit 40 to obtain a first calibrated right image and a first calibrated left image. Hereinafter, when it is not necessary to distinguish the right image and the left image from each other, the right image and the left image are simply called an image. When it is not necessary to distinguish the first calibrated right image and the first calibrated left image from each other, the first calibrated right image and the first calibrated left image are simply called a first calibrated image.

For example, the first calibration unit 60 expresses lens distortion in an image using a radial distortion model and a tangential distortion model and calibrates (corrects) lens distortion. In this case, if a lens distortion parameter is $K=(K_1,K_2,K_3,K_4,K_5)$, a normalized image coordinate with no lens distortion is $X_n=(x,y)$, and a normalized coordinate with lens distortion is $X_d(x_d,y_d)$, the first calibration unit 60 expresses the normalized coordinate $X_d$ with lens distortion by Equation (1).

$$x_d = (1+k_1 r^2 + k_2 r^4 + k_5 r^6) x_n + dx \qquad (1)$$

If $r=x^2+y^2$, dx is expressed by Equation (2).

$$dx = \begin{bmatrix} 2k_3 xy + k_4(r^2 + 2x^2) \\ k_3(r^2 + 2y^2) + 2k_4 xy \end{bmatrix} \qquad (2)$$

The first calibration unit 60 expresses the image coordinate $X_p$ with lens distortion by Equation (3) using the normalized image coordinate $X_d$ with lens distortion, and corrects lens distortion.

$$x_p = \begin{bmatrix} x_p \\ y_p \end{bmatrix} = \begin{bmatrix} f_x x_d + c_x \\ f_y y_d + c_y \end{bmatrix} \qquad (3)$$

Here, $(f_x,f_y)$ is a value obtained by dividing a focal distance by an effective pixel pitch, and $(c_x,c_y)$ is an image center. $f_x$, $f_y$, $c_x$, $c_y$, and K are obtained by carrying out the calibration operations of the first imaging unit 10 and the second imaging unit 20 in advance.

Figure 5:
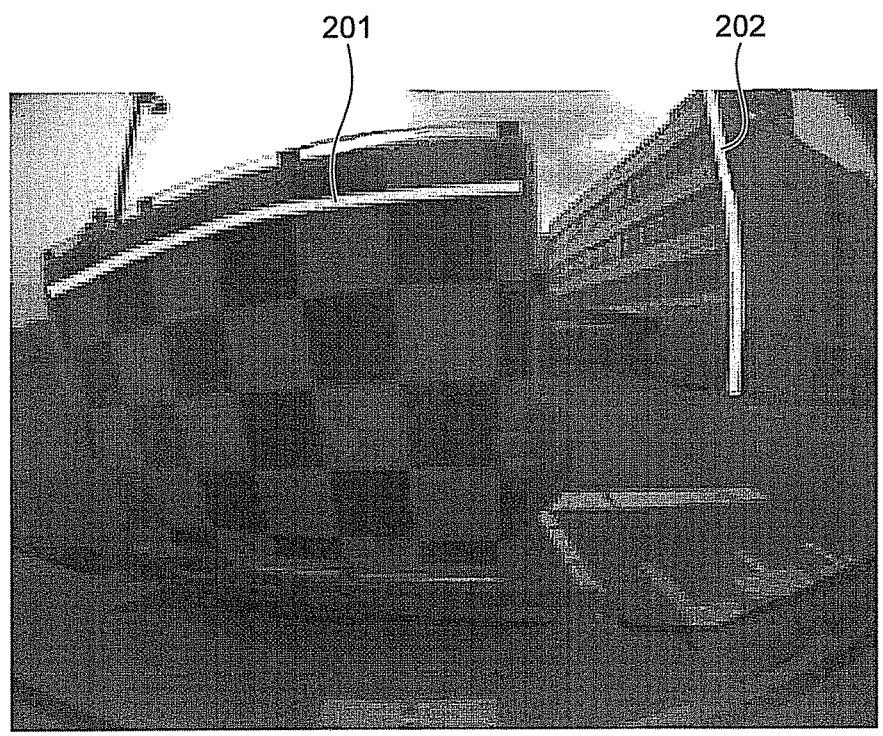
FIG. 5 is a diagram showing an example of an image before lens distortion correction in the embodiment is carried out.
Figure 6:
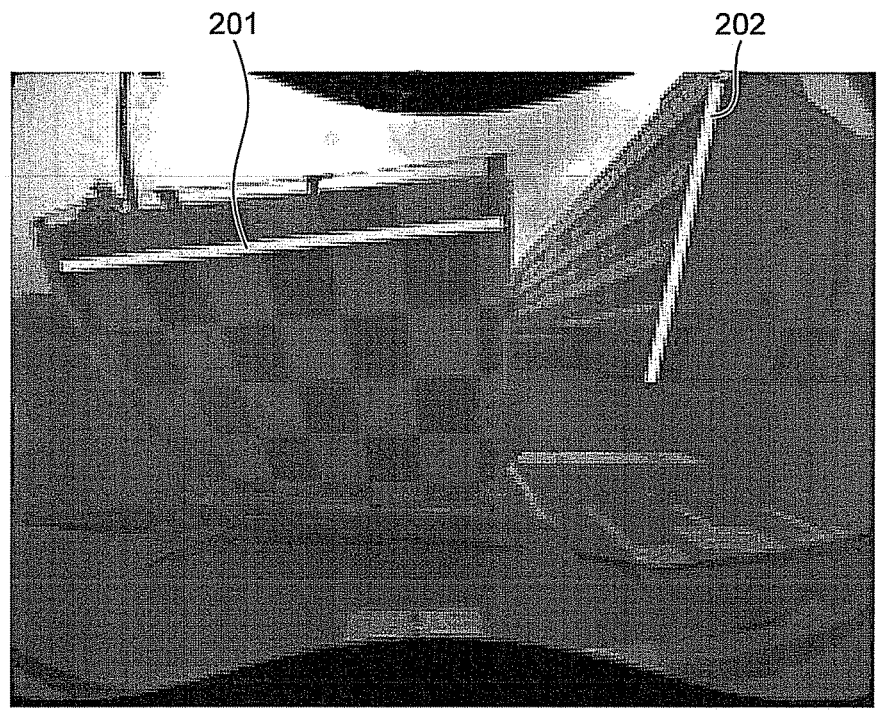
FIG. 6 is a diagram showing an example of a first calibrated image after the lens distortion correction in the embodiment is carried out.

FIG. 5 is a diagram showing an example of an image before lens distortion correction. FIG. 6 is a diagram showing an example of a first calibrated image after lens distortion correction. While in the image before lens distortion correction of FIG. 5, a line segment 201 and a line segment 202 are curved due to lens distortion, in the first calibrated image after lens distortion correction of FIG. 6, lens distortion is corrected, and the line segment 201 and the line segment 202 are calibrated linearly.

The second calibration unit 70 carries out calibration to align the corresponding positions of the first calibrated right image and the first calibrated left image calibrated by the first calibration unit 60 with each other horizontally and to verticalize an object in each image with respect to a plane, and obtains a second calibrated right image and a second calibrated left image. The second calibration unit 70 includes a first calculation unit 72, a second calculation unit 74, and a conversion unit 76.

The first calculation unit 72 calculates a stereo calibration parameter for parallelization conversion to align the corresponding positions of the first calibrated right image and the first calibrated left image (stereo image) calibrated by the first calibration unit 60 with each other horizontally. That is, the first calculation unit 72 calculates a stereo calibration parameter for parallelization conversion such that the epipolar lines in the first calibrated right image and the first calibrated left image are all horizontally aligned with each other, and the corresponding positions of the first calibrated right image and the first calibrated left image are aligned with each other horizontally. An epipolar line refers to a line which is uniquely determined when a line connecting a target point of one camera and an optical center is projected onto another camera.

Hereinafter, the stereo calibration parameter of the first imaging unit 10 (right image) is $W_{s1}$, and the stereo calibration parameter of the second imaging unit 20 (left image) is $W_{s2}$. When it is not necessary to distinguish the stereo calibration parameters from each other, the stereo calibration parameters are simply called a stereo calibration parameter $W_s$. The stereo calibration parameter $W_s$ is expressed by a projective conversion matrix of 3 rows and 3 columns.

Here, two methods will be described with regard to the calculation method of the stereo calibration parameter $W_s$. The first calculation unit 72 may calculate the stereo calibration parameter $W_s$ using any of the methods.

The first method will be described. In the first method, the first calculation unit 72 calculates the stereo calibration parameter $W_s$ using the external parameter and the internal parameter of each of the first imaging unit 10 and the second imaging unit 20. Here, the external parameter includes a rotation matrix and a translation vector from the world coordinate, or the like. The internal parameter includes an image center, a value obtained by dividing the focal distance of each of the first imaging unit 10 and the second imaging unit 20 by an effective pixel pitch, or the like.

Figure 7:
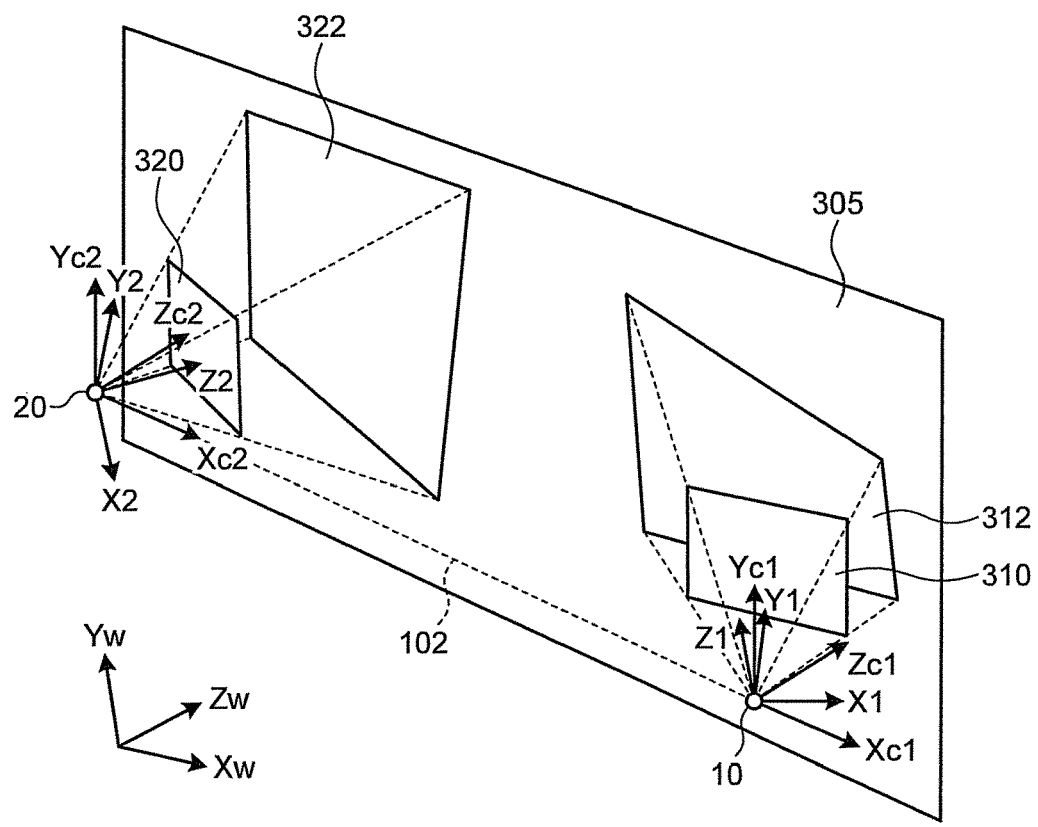
FIG. 7 is an explanatory view illustrating an example of a method of calculating a stereo calibration parameter in the embodiment.

FIG. 7 is an explanatory view showing an example of a calculation method of the stereo calibration parameter $W_s$. In the example of FIG. 7, the first calculation unit 72 calculates the stereo calibration parameter $W_{s1}$ for converting the right image of the first imaging unit 10 which is projected onto an image surface 310 to an image 312, which is virtually arranged in parallel and projected on the same image surface 305 by both the first imaging unit 10 and the second imaging unit 20, by parallelization conversion. Similarly, the first calculation unit 72 calculates the stereo calibration parameter $W_{s2}$ for converting the left image of the second imaging unit 20 which is projected onto an image surface 320 to an image 322, which is virtually arranged in parallel and projected on the image surface 305, by parallelization conversion.

The coordinate axes and the like of the first imaging unit 10 and the second imaging unit 20 are the same as shown in FIG. 2. That is, the axes representing the actual camera coordinate system of the first imaging unit 10 are the X1 axis, the Y1 axis, and the Z1 axis, and the axes representing the actual camera coordinate system of the second imaging unit 20 are the X2 axis, the Y2 axis, and the Z2 axis. Here, the actual camera coordinate system refers to the camera coordinate system before parallelization conversion. In this embodiment, as described above, since there is no need for parallel stereo arrangement of the first imaging unit 10 and the second imaging unit 20, it is not necessary that the Z1 axis and the Z2 axis as the optical axis direction are in parallel. The Xw, Yw, and Zw axes represent the coordinate axes of the world coordinate system.

Specifically, the first calculation unit 72 virtually rotates the actual camera coordinate systems (the X1 axis, the Y1 axis, and the Z1 axis, and the X2 axis, the Y2 axis, and the Z2 axis) of the first imaging unit 10 and the second imaging unit 20 such that the baseline vector 102 is in parallel to the horizontal axes (the Xc1 axis and the Xc2 axis) of the camera coordinate systems of the first imaging unit 10 and the second imaging unit 20. At this time, the first calculation unit 72 aligns the directions of the Zc1 axis and the Zc2 axis and the directions of the Yc1 axis and the Yc2 axis such that the first imaging unit 10 and the second imaging unit 20 are virtually arranged in parallel. Thus, the first calculation unit 72 calculates the coordinate axes (Xc1, Yc1, and Zc1) of the virtual camera coordinate system of the first imaging unit 10 and the coordinate axes (Xc2, Yc2, and Zc2) of the virtual camera coordinate system of the second imaging unit 20. Thus, the same rotation matrix is used to convert the coordinate axes (Xw, Yw, and Zw) of the world coordinate system to the coordinate axes (Xc1, Yc1, and Zc1) of the virtual camera coordinate system of the first imaging unit 10 and the coordinate axes (Xc2, Yc2, and Zc2) of the virtual camera coordinate system of the second imaging unit 20. The first calculation unit 72 creates the virtual internal parameters by adjusting the internal parameters of both the imaging units such that the image surface is identical between the first imaging unit 10 and the second imaging unit 20.

The first calculation unit 72 calculates (estimates) a projective conversion matrix (stereo calibration parameter $W_{s1}$) for converting the right image projected onto the image surface 310 to the image 312 using a rotation matrix which rotates the coordinate axes of the actual camera coordinate system of the first imaging unit 10 to the coordinate axes of the virtual camera coordinate axes, the virtual internal parameters of the first imaging unit 10, and the like. Similarly, the first calculation unit 72 calculates (estimates) a projective conversion matrix (stereo calibration parameter $W_{s2}$) for converting the right image projected onto the image surface 320 to the image 322 using a rotation matrix which rotates the coordinate axes of the actual camera coordinate system of the second imaging unit 20 to the coordinate axes of the virtual camera coordinate system, the virtual internal parameters of the second imaging unit 20, and the like.

Next, a second method will be described. In the second method, the first calculation unit 72 obtains eight or more sets of corresponding points of the right image captured by the first imaging unit 10 and the left image captured by the second imaging unit 20, and calculates the stereo calibration parameter $W_s$ from the sets of corresponding points. In this case, the first calculation unit 72 calculates a basic matrix from the obtained sets of corresponding points, estimates the direction of an epipolar point in each image from the calculated basic matrix, and rotates each image such that the estimated epipolar point is in the horizontal direction. The first calculation unit 72 carries out projective conversion on each image such that the epipolar point is mapped infinitely in the horizontal direction, and again carries out projective conversion such that the corresponding feature points of both images have the same height. The first calculation unit 72 carries out rotation conversion once and carries out projective conversion two times until when images subjected to parallelization conversion are obtained from the right image and the left image. Since these kinds of conversion can be represented by single projective conversion, this is set as the stereo calibration parameter $W_{si}$. Meanwhile, i represents 1 or 2.

Figure 8:
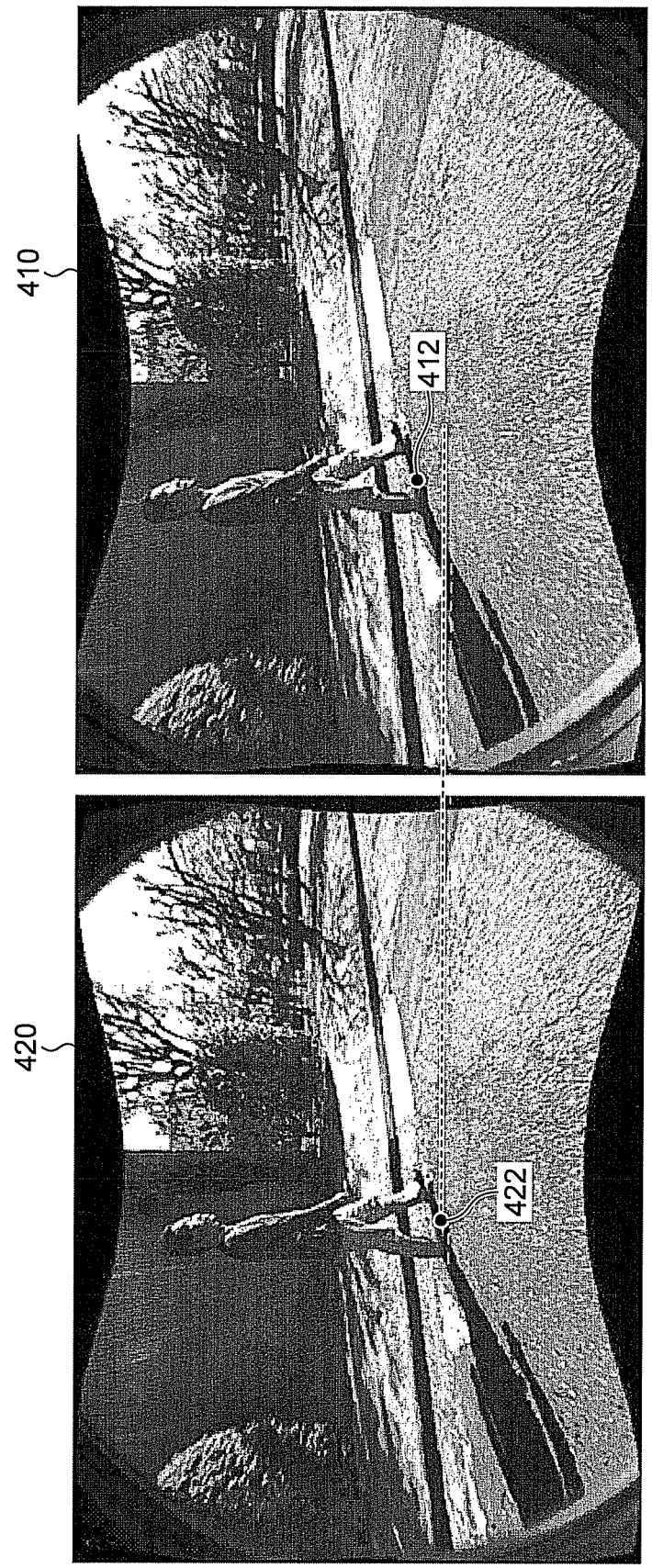
FIG. 8 is a diagram showing an example of a left image and a right image before parallelization conversion in the embodiment is carried out.
Figure 9:
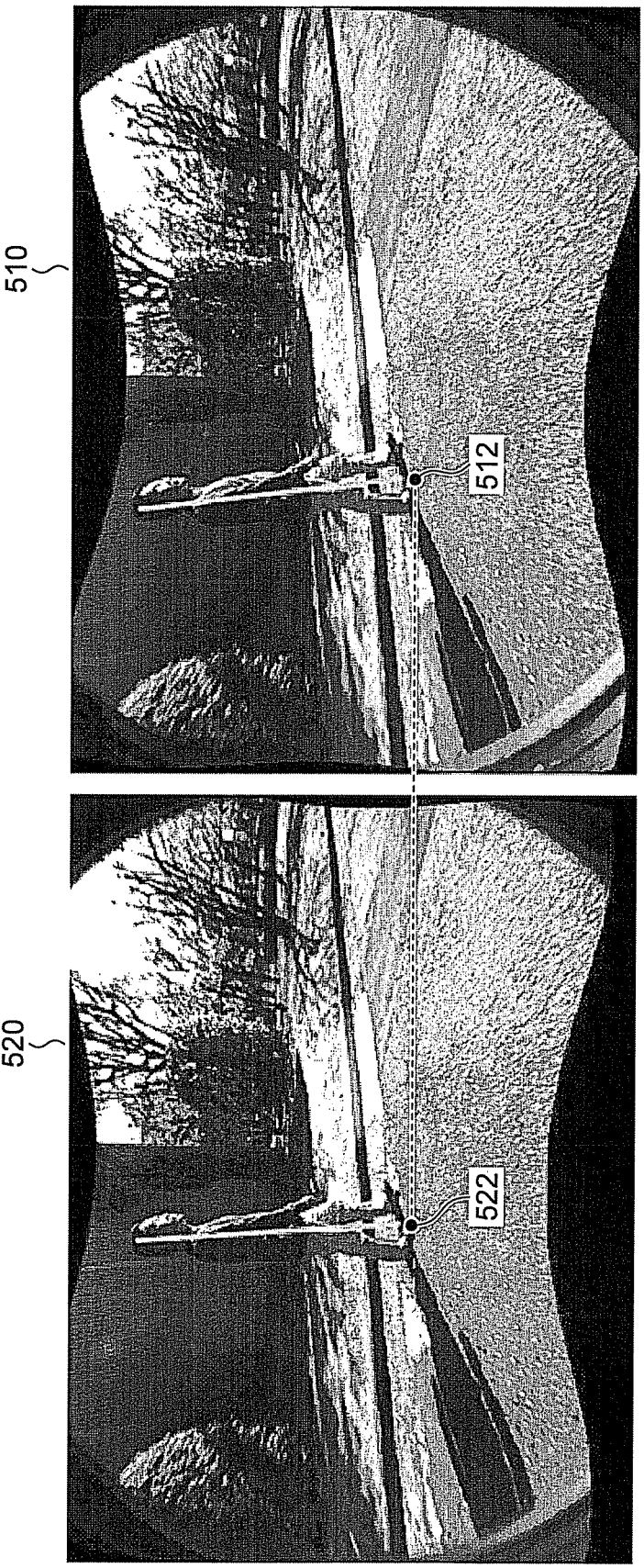
FIG. 9 is a diagram showing an example of a parallelized left image and a parallelized right image in the embodiment.

FIG. 8 is a diagram showing a left image and a right image before parallelization conversion. FIG. 9 is a diagram showing an example of a parallelized left image and a parallelized right image after parallelization conversion. Meanwhile, parallelization conversion using the stereo calibration parameter $W_s$ calculated by the first calculation unit 72 is carried out by the conversion unit 76 described below. In the example of FIG. 8, a target point 422 of a left image 420 and a corresponding target point 412 of a right image 410 are not on the horizontal line. In the example of FIG. 9, the corresponding target points of the images are converted by parallelization conversion so as to be on the horizontal line. A target point 522 of a parallelized left image 520 and a corresponding target point 512 of a parallelized right image 510 are on the horizontal line.

The second calculation unit 74 calculates a verticalization conversion parameter for carrying out verticalization conversion of the first calibrated right image and the first calibrated left image calibrated by the first calculation unit 72 such that an object in an image is verticalized with respect to a plane. In the following description, when it is not necessary to distinguish the first imaging unit 10 and the second imaging unit 20 from each other, the first imaging unit 10 and the second imaging unit 20 may be simply called an imaging unit. A verticalization conversion parameter $W_v$ is expressed by a projective conversion matrix of 3 rows and 3 columns.

Figure 10:
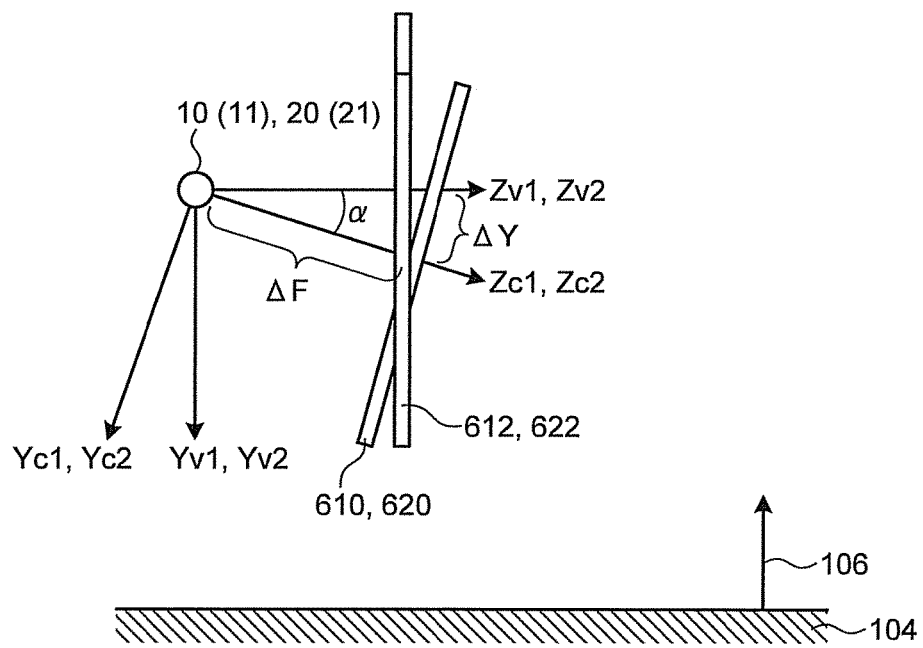
FIG. 10 is an explanatory view illustrating an example of a method of calculating a verticalization conversion parameter in the embodiment.

FIG. 10 is an explanatory view showing an example of a calculation method of the verticalization conversion parameter $W_v$. In the example of FIG. 10, the second calculation unit 74 virtually rotates a right image 610 of the first imaging unit 10 and a left image 620 of the second imaging unit 20 around the optical center 11 of the first imaging unit 10 and the optical center 21 of the second imaging unit 20 such that the optical axes of the first imaging unit 10 and the second imaging unit 20 are horizontally aligned, calculating the verticalization conversion parameter $W_v$ for conversion to a verticalized right image 612 and a verticalized left image 622.

Specifically, the second calculation unit 74 calculates the verticalization conversion parameter $W_v$ by Equation (4).

$$W_v = A_o R A_v^{-1} \qquad (4)$$

Here, $A_v$ is a virtual internal parameter of the imaging unit after verticalization conversion, and $A_o$ is a virtual internal parameter of the imaging unit after parallelization conversion. $A_v$ and $A_o$ may have the same value or may be set to new values. R is a rotation matrix which converts the virtual camera coordinate system of the imaging unit after parallelization conversion to the virtual camera coordinate system of the imaging unit after verticalization conversion, and is expressed by Equation (5).

$$R = \begin{bmatrix} 1 & 0 & 0 \\ 0 & \cos\alpha & -\sin\alpha \\ 0 & \sin\alpha & \cos\alpha \end{bmatrix} \qquad (5)$$

Here, α represents a depression angle. Three methods will be described with regard to a calculation (estimation) method of the depression angle α. The second calculation unit 74 may calculate the depression angle α by any method.

First, a first method will be described. In the first method, the second calculation unit 74 estimates the normal vector 106 of the plane 104 from the projective conversion matrix of the plane 104 between the right image 610 and the left image 620 (stereo image). With the arrangement of the first imaging unit 10 and the second imaging unit 20 shown in FIG. 2, the normal vector 106 has no component on the Xc1 axis of the first imaging unit 10 and the Xc2 axis of the second imaging unit 20. Thus, the second calculation unit 74 can calculate the depression angle α.

Next, a second method will be described. In the second method, the second calculation unit 74 carries out estimation using the position of a horizontal line on an image and the internal parameter of the imaging unit. Here, if the position of the horizontal line is yh and the optical center as the internal parameter is represented by the (cx,cy), as shown in FIG. 10, the second calculation unit 74 estimates the depression angle α by Equation (6) from the focal distance ΔF of the imaging unit and the distance Δ(cx−yh) from the horizontal line to the optical center.

$$\alpha = \arctan \frac{\Delta Y}{\Delta F} \qquad (6)$$

Next, a third method will be described. In the third method, the second calculation unit 74 carries out conversion such that an object which spatially stands vertically is vertical on an image.

Figure 11:
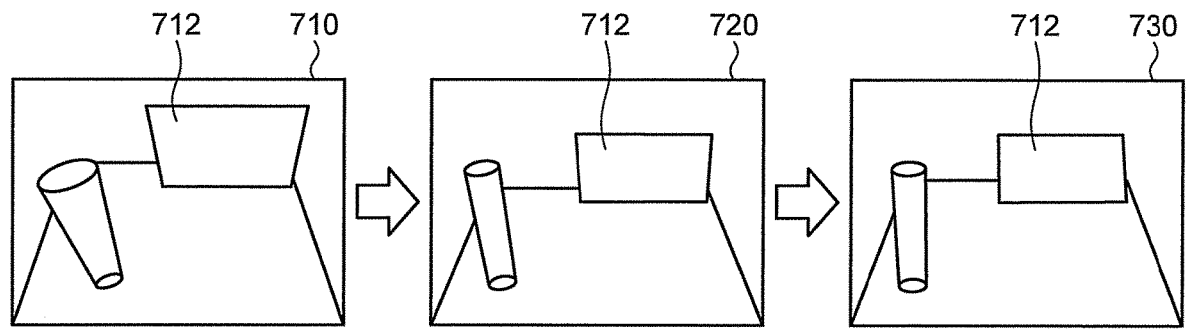
FIG. 11 is an explanatory view illustrating an example of a method of calculating a depression angle in the embodiment.

FIG. 11 is an explanatory view showing an example of a calculation method of the depression angle α. As shown in FIG. 11, the second calculation unit 74 generates an image 720, in which the depression angle α is changed slightly from 0 degrees (the imaging unit is virtually rotated) with respect to an image 710 which is placed such that an object 712 which stands vertically is reflected in an end portion, by a method described in connection with the conversion unit 76 described below. When the object 712 is not projected vertically in the generated image 720, the second calculation unit 74 generates an image with the depression angle α changed again and finally obtains an image 730 in which the object 712 is projected vertically. The second calculation unit 74 uses the depression angle α, which is used to generate the image 730, as a correct value.

The second calculation unit 74 may calculate the depression angle α by Equation (6) while changing the position yh of the horizontal line on each of the image 710 and the image 720, instead of changing the depression angle α. In this case, the second calculation unit 74 may subsequently move up and down the horizontal line such that the object 712 is projected vertically.

The second calculation unit 74 may calculate an adjustment conversion parameter for parallel movement in the vertical direction such that the horizontal line position on an image, in which an object in the image is calibrated vertically with respect to a plane, becomes a horizontal line position designated in advance, and may add the adjustment conversion parameter to the verticalization conversion parameter. Specifically, the second calculation unit 74 may add an adjustment conversion parameter, which is for parallel movement in the vertical direction such that the position of the horizontal line is not changed before and after verticalization conversion, to the verticalization conversion parameter.

Figure 12:
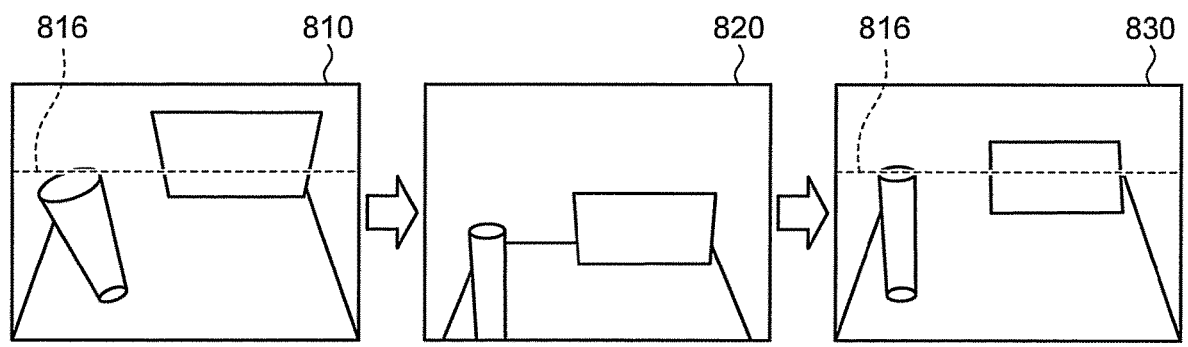
FIG. 12 is an explanatory view illustrating an example of a method of calculating an adjustment conversion parameter in the embodiment.

FIG. 12 is an explanatory view showing an example of a calculation method of the adjustment conversion parameter S. As shown in FIG. 12, the second calculation unit 74 virtually rotates the imaging unit with respect to an image 810 before verticalization conversion to generate an image 820. Meanwhile, only by virtually rotating the imaging unit, it is difficult to display a subject at an appropriate position. Thus, the second calculation unit 74 moves the image surface such that the position of a horizontal line (not shown) which is projected onto the image 820 is not shifted from a horizontal line 816 of the image 810, like an image 830, aligns the horizontal line 816 of the image 810 and the horizontal line 816 of the image 830 with each other, and calculates the adjustment conversion parameter S such that a subject is appropriately projected onto an image. The second calculation unit 74 adds the calculated adjustment conversion parameter S to the verticalization conversion parameter W.

Here, the adjustment conversion parameter S and the verticalization conversion parameter $W_v$ have the relationship expressed by Equation (7).

$$W_v = A_o R A_v^{-1} S \qquad (7)$$

Meanwhile, the adjustment conversion parameter S is expressed by Equation (8).

$$S = \begin{bmatrix} 1 & 0 & 0 \\ 0 & 1 & \Delta\mathit{diff} \\ 0 & 0 & 1 \end{bmatrix} \qquad (8)$$

Here, $\Delta\mathit{diff}$ is obtained by Equation (9).

$$\Delta\mathit{diff} = \frac{w_v^{-1}[4] \times yh + w_v^{-1}[5]}{w_v^{-1}[7] \times yh + w_v^{-1}[8]} - yh \qquad (9)$$

$W_v^{-1}$ is expressed by Equation (10). yh is the longitudinal position of the horizontal line 816 on the image.

$$W_v^{-1} = \begin{bmatrix} w_v^{-1}[0] & w_v^{-1}[1] & w_v^{-1}[2] \\ w_v^{-1}[3] & w_v^{-1}[4] & w_v^{-1}[5] \\ w_v^{-1}[6] & w_v^{-1}[7] & w_v^{-1}[8] \end{bmatrix} \qquad (10)$$

In order that the horizontal line position is not changed before and after verticalization conversion, the second calculation unit 74 may use the verticalization conversion parameter $W_v$ calculated by Equation (7), instead of the verticalization conversion parameter $W_v$ calculated by Equation (4).

The conversion unit 76 carries out image conversion on the first calibrated right image and the first calibrated left image calibrated by the first calibration unit 60 using the stereo calibration parameter $W_s$ calculated by the first calculation unit 72 and the verticalization conversion parameter $W_v$ calculated by the second calculation unit 74, and obtains the second calibrated right image and the second calibrated left image.

The conversion parameter $W_{svi}$ which is used by the conversion unit 76 for image conversion is expressed by Equation (11). Meanwhile, i represents 1 or 2.

$$W_{svi} = W_{si} W_v \qquad (11)$$

The relationship between the conversion parameter $W_{svi}$ and the image coordinate is expressed by Equation (12), and the conversion unit 76 creates an image using linear interpolation, bicubic interpolation, or the like.

$$\tilde{m}_o \sim W_{sv} * \tilde{m}_n \qquad (12)$$

where, $\tilde{m}_n$ is a homogeneous coordinate of an image after conversion, and $\tilde{m}_o$ is a homogeneous coordinate of an image before conversion.

The second calibration unit 70 may directly calculate the conversion parameter $W_{svi}$ without calculating the stereo calibration parameter $W_s$ and the verticalization conversion parameter $W_v$. In this case, in the first method of the stereo calibration parameter $W_s$, the second calibration unit 70 aligns the horizontal axes (the Xc1 axis and the Xc2 axis) of the actual camera coordinate systems of the first imaging unit 10 and the second imaging unit 20 with each other in the optical axis direction, and then aligns the vertical axes (the Yc1 axis and the Yc2 axis) in the direction of the normal vector of the plane. The second calibration unit 70 determines the Zch axis such that the Zch axis is perpendicular to each of the Xch axis and the Ych axis. Meanwhile, h represents 1 or 2. As a result, the estimated stereo calibration parameter $W_{si}$ satisfies the verticalized condition, and becomes synonymous with the conversion parameter $W_{svi}$.

Figure 13:
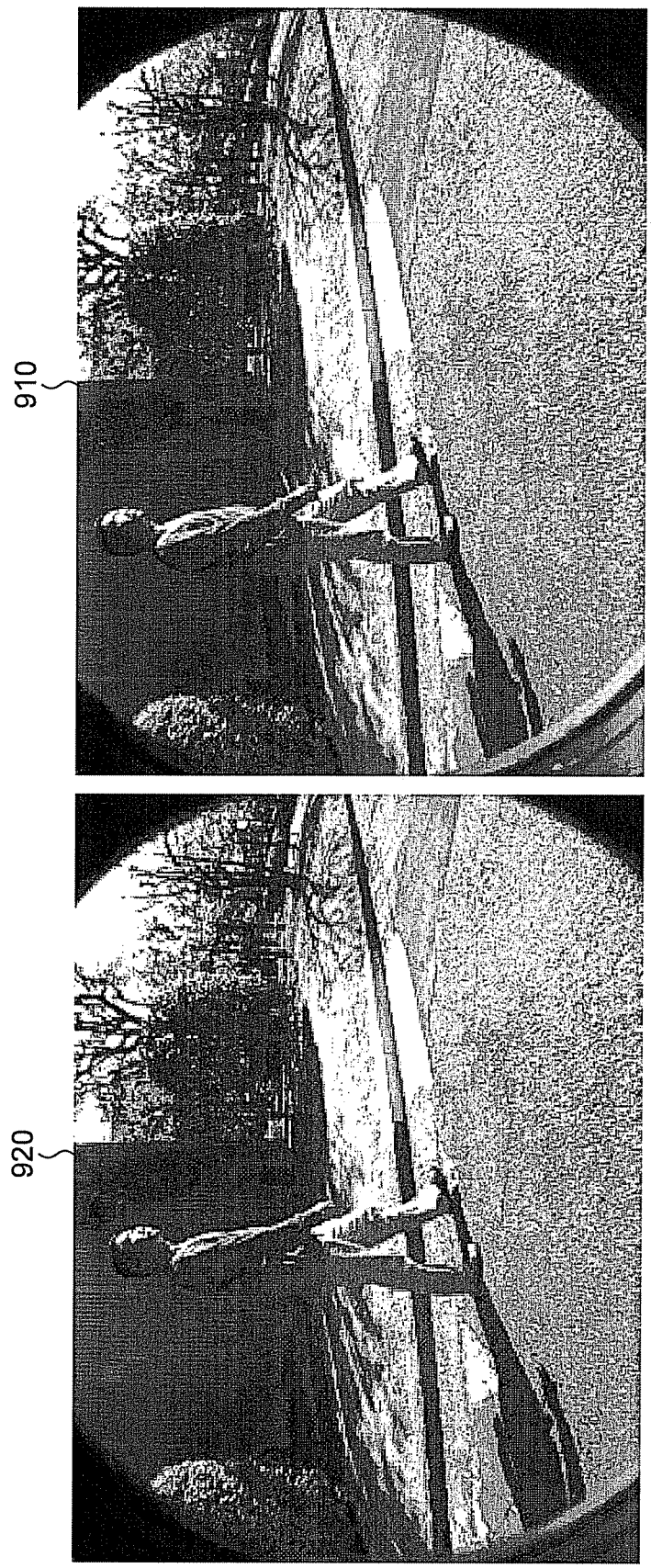
FIG. 13 is a diagram showing an example of a right image and a left image before calibration in the embodiment is carried out.
Figure 14:
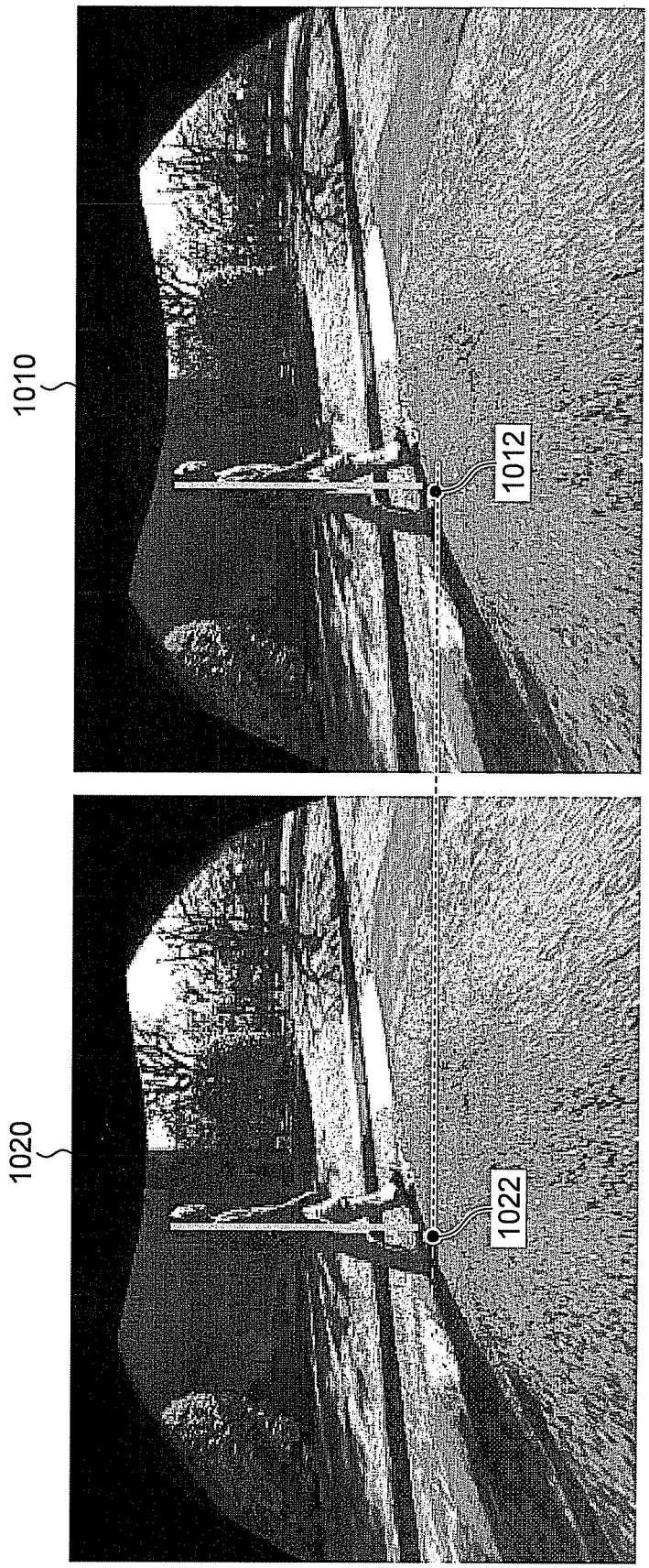
FIG. 14 is a diagram showing a second corrected right image and a second corrected left image in the embodiment.

FIG. 13 is a diagram showing an example of a right image and a left image before calibration. FIG. 14 is a diagram showing an example of a second calibrated right image and a second calibrated left image after second calibration. In the example of FIG. 13, the corresponding positions between a left image 920 and a right image 910 (stereo image) are not aligned with each other horizontally, and the human being in the image is not vertical to the road surface. Meanwhile, in the example of FIG. 14, the corresponding target points of the images are converted so as to be on the horizontal line by second calibration (parallelization conversion and verticalization conversion). A target point 1022 of a second calibrated left image 1020 and a target point 1012 of a second calibrated right image 1010 are on the horizontal line. The human being in the image is vertical to the road surface. In this way, with the calibration by the second calibration unit 70, an image is generated which is projected such that a vertical object is verticalized while a stereo image is parallelized.

The generation unit 80 generates a 3D image from the second calibrated right image and the second calibrated left image calibrated by the second calibration unit 70.

The display control unit 90 displays the 3D image generated by the generation unit 80 on the display unit 30.

Figure 15:
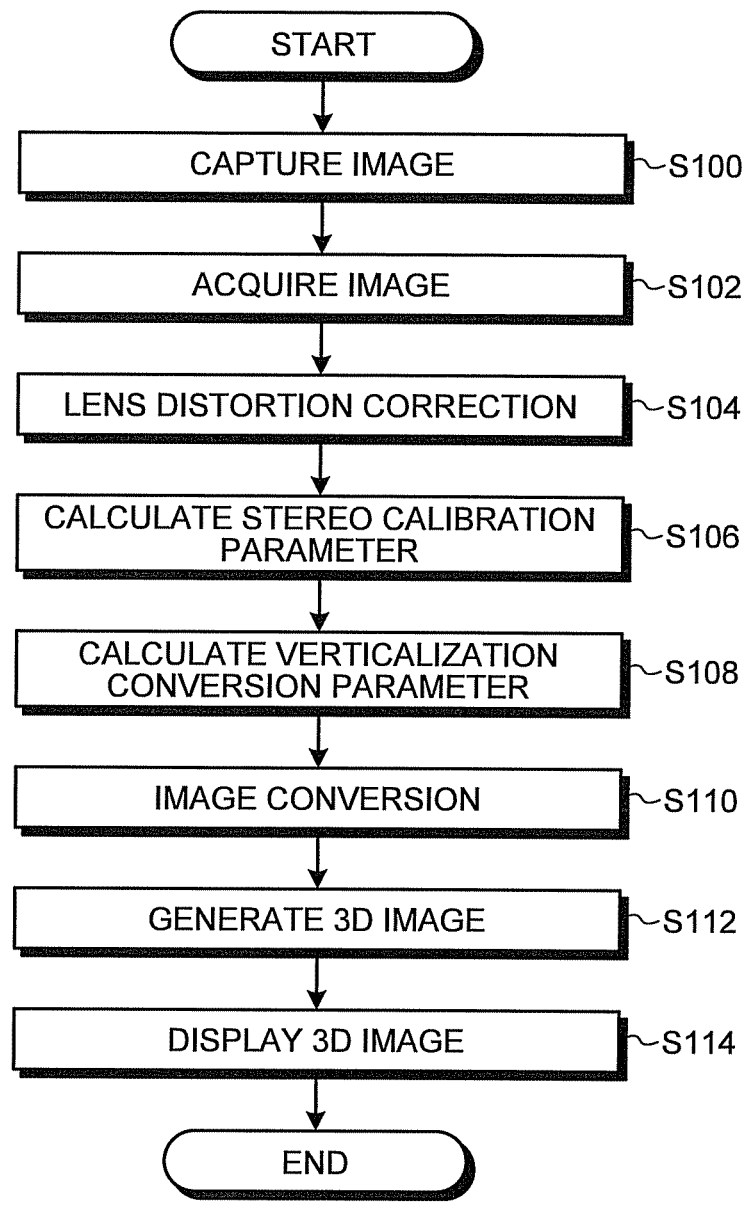
FIG. 15 is a flowchart showing an example of image processing according to the embodiment.

FIG. 15 is a flowchart showing the flow of a procedure of image processing in the image processing apparatus 1 of this embodiment.

First, the first imaging unit 10 and the second imaging unit 20 which are arranged such that the baseline vector connecting the optical centers thereof is perpendicular to the normal vector of the plane capture an image of an overlapping region (Step S100).

Next, the acquisition unit 40 acquires a stereo image captured by the first imaging unit 10 and the second imaging unit 20 (a right image captured by the first imaging unit 10 and a left image captured by the second imaging unit 20) (Step S102).

Next, the first calibration unit 60 corrects (calibrates) lens distortion in each of the right image and the left image acquired by the acquisition unit 40 to obtain a first calibrated right image and a first calibrated left image (Step S104).

Next, the first calculation unit 72 calculates a stereo calibration parameter for parallelization conversion to align the corresponding points of the first calibrated right image and the first calibrated left image (stereo image) calibrated by the first calibration unit 60 with each other horizontally (Step S106).

Next, the second calculation unit 74 calculates a verticalization conversion parameter for verticalization conversion to verticalize an object in each of the first calibrated right image and the first calibrated left image calibrated by the first calibration unit 60 vertical with respect to a plane (Step S108). At this time, the second calculation unit 74 may calculate an adjustment conversion parameter for parallel movement in the vertical direction such that the horizontal line position on an image in which an object of the image is calibrated vertically with respect to a plane becomes a horizontal line position designated in advance, and may add the adjustment conversion parameter to the verticalization conversion parameter.

Next, the conversion unit 76 carries out image conversion on the first calibrated right image and the first calibrated left image calibrated by the first calibration unit 60 using the stereo calibration parameter calculated by the first calculation unit 72 and the verticalization conversion parameter calculated by the second calculation unit 74 (Step S110).

Next, the generation unit 80 generates a 3D image from the second calibrated right image and the second calibrated left image subjected to image conversion by the conversion unit 76 (Step S112).

Next, the display control unit 90 displays the 3D image generated by the generation unit 80 on the display unit 30 (Step S114).

As described above, in this embodiment, the first imaging unit 10 and the second imaging unit 20 are arranged such that the baseline vector connecting the optical centers thereof is perpendicular to the normal vector of the plane. For this reason, the arrangement of the first imaging unit 10 and the second imaging unit 20 geometrically satisfies the requirements of parallelization and verticalization, and even both verticalization conversion and parallelization conversion are carried out on the image (stereo image), both verticalization conversion and parallelization conversion can be maintained. Thus, a 3D image can be created directly from a stereo image after verticalization conversion and parallelization conversion, and a 3D image which is easily recognized by the human being can be generated at high speed.

In realizing parallelization conversion and verticalization conversion, a method may also be considered in which a parallax is estimated from images of a stereo camera, and the images are combined from the estimated parallax to create a 3D image. In this case, however, it is necessary to calculate the corresponding positions between the images so as to estimate a parallax. The corresponding positions between the images are obtained by searching for an epipolar line of a reference image (another stereo image) with respect to a target point of a standard image (one stereo image) and finding a position having the highest similarity to the target point. Meanwhile, in general, an epipolar line differs depending on the position of a target point set on the standard image. For this reason, an epipolar line should be found for each target point, causing an increase in calculation cost.

In contrast, in this embodiment, it is not necessary to estimate a parallax, thus a 3D image which is easily recognized by the human being can be generated at high speed.

For example, if the image processing apparatus 1 of this embodiment is applied to a perimeter monitoring apparatus in which an image of a monitor of a rearview camera mounted on a vehicle is displayed on a navigation screen having a three-dimensional display function, a driver can confirm the condition of the rear three-dimensionally, contributing to improvement in safety at the time of going backward. In particular, in the image processing apparatus 1 of this embodiment, since verticalization conversion is carried out, an object which spatially stands vertically is projected vertically on an image, making it easy to detect the distance to an obstacle or the type of an object.

First Modification

In the foregoing embodiment, an example has been described where lens distortion is corrected, and the conversion parameter $W_{svi}$ (stereo calibration parameter $W_s$ and verticalization conversion parameter $W_v$) are calculated to carry out parallelization conversion and verticalization conversion. In the first modification, an example will be described where, with the use of the conversion results, correction of lens distortion, parallelization conversion, and verticalization conversion are carried out by single conversion, without calculating the conversion parameter $W_{svi}$. Hereinafter, description will be provided focusing on the difference from the foregoing embodiment. The components having the same functions as those in the foregoing embodiment are represented by the same reference numerals as in the first embodiment, and description thereof will be omitted.

Figure 16:
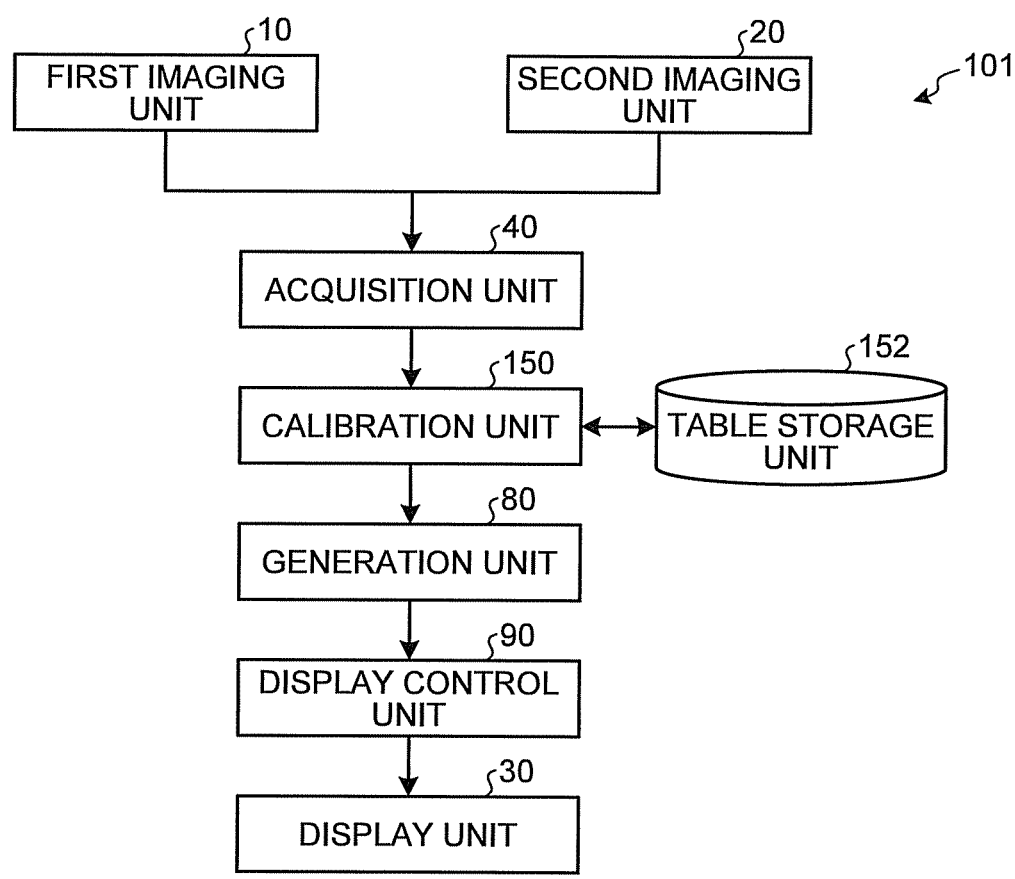
FIG. 16 is a block diagram showing a configuration example of an image processing apparatus according to a first modification.

FIG. 16 is a block diagram showing an example of the configuration of an image processing apparatus 101 according to the first modification. As shown in FIG. 16, the image processing apparatus 101 of the first modification is different from the image processing apparatus 1 of the foregoing embodiment in that the processing content of a calibration unit 150 is different, and a table storage unit 152 is further provided.

The table storage unit 152 stores a position information table in which image position information representing the positions on the right image captured by the first imaging unit 10 and the left image captured by the second imaging unit 20 is associated with calibrated image position information representing the positions on the second calibrated right image and the second calibrated left image. That is, the table storage unit 152 stores a position information table in which image position information representing the positions on the stereo image before lens distortion correction is associated with image position information representing the positions on the stereo image after lens distortion correction, parallelization conversion, and verticalization conversion. The table storage unit 152 can be realized by, for example, at least one of magnetically, optically, or electrically storable existing storage mediums, such as a Hard Disk Drive (HDD), a Solid State Drive (SSD), and a memory card. The position information table maybe created after being calibrated by the calibration unit 150 or may be created in advance.

The calibration unit 150 calibrates a right image newly captured by the first imaging unit 10 and a left image newly captured by the second imaging unit 20 using the position information table stored in the table storage unit 152, and obtains a calibrated right image and a calibrated left image after lens distortion correction, parallelization conversion, and verticalization conversion.

According to the first modification, with the use of the position information table, correction of lens distortion, parallelization conversion, and verticalization conversion can be carried out by single conversion without calculating the conversion parameter $W_{svt}$, making it possible to suppress calculation cost.

Second Modification

In the foregoing embodiment, an example has been described where the 3D image generated from the second calibrated right image and the second calibrated left image is displayed on the display unit 30. Alternatively, a parallax may be estimated by finding the corresponding positions between the images from the 3D image and a solid object may be detected from the estimated parallax, or an object may be recognized using an image pattern. At least one of the second calibrated right image and the second calibrated left image may be displayed on the display unit 30 as it is. In this case, the display unit 30 may be a typical display, not a three-dimensional display.

The image processing apparatus of the foregoing embodiment and each modification includes a control device, such as a Central Processing Unit (CPU), a storage device, such as a ROM or a RAM, an external storage device, such as an HDD or an SSD, a display device, such as a three-dimensional display, an imaging device, such as a wide-angle camera, and the like, and can be realized by the hardware configuration using a typical computer. The respective units of the image processing apparatus of the foregoing embodiment and each modification may be realized by hardware or by software.

As described above, according to the embodiment and the modifications, it is possible to generate an image while maintaining both the verticalization conversion and the parallelization conversion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus installed on a vehicle, the image processing apparatus comprising:
   imaging devices that capture an overlapping region; and
   processing circuitry configured to calibrate captured images by correcting lens distortion in each of the captured images, aligning corresponding positions of the captured images with each other horizontally, and verticalizing an object within the captured images;
   wherein the imaging devices are arranged such that a baseline vector connecting optical centers of the imaging devices is perpendicular to a normal vector that is normal to a road surface, and
   the processing circuitry carries out, collectively,
     calibration to align corresponding positions of the captured images with each other horizontally by performing a parallelization conversion such that epipolar lines in the captured images are horizontally aligned with each other and
     calibration to verticalize an object within the captured images by virtually rotating, about an axis parallel to the baseline vector, the horizontally aligned captured images with respect to a line perpendicular to the road surface based on a depression angle such that optical axes of the imaging devices are horizontally aligned, the depression angle being an angle of the imaging devices fixed with respect to the vehicle.

2. The image processing apparatus according to claim 1, wherein the processing circuitry calibrates lens distortion in each of the captured images to obtain first calibrated images and carries out calibration to align corresponding positions of the first calibrated images with each other horizontally and to verticalize the object within the captured images with respect to the road surface to obtain second calibrated images.

3. The image processing apparatus according to claim 2, wherein the processing circuitry virtually rotates the imaging devices to calibrate the object in each of the first calibrated images vertically with respect to the road surface and carries out parallel movement in a vertical direction such that a horizontal position of an image of the first calibrated images becomes a horizontal position designated in advance.

4. The image processing apparatus according to claim 1, further comprising:
   a storage medium that stores a positional information table in which image position information representing a position on each of the captured images is associated with calibrated image position information representing the position on each of the calibrated images,
   wherein the processing circuitry calibrates the captured images using the position information table to obtain the calibrated images.

5. The image processing apparatus according to claim 1, further comprising:
   a display that displays at least one of the calibrated images or a stereoscopic image based on the calibrated images.

6. An image processing apparatus installed on a vehicle, the image processing apparatus comprising:
   imaging devices that capture an overlapping region; and
   processing circuitry configured to calibrate captured images to obtain calibrated images in which lens distortion in each of the captured images is corrected and corresponding positions of the captured images are aligned with each other horizontally by performing a parallelization conversion such that epipolar lines in the captured images are horizontally aligned with each other to yield horizontally aligned captured images and the epipolar lines are adjusted to a surface perpendicular to a plane by virtually rotating, about an axis parallel to a baseline vector, the horizontally aligned captured images based on a depression angle such that optical axes of the imaging devices are horizontally aligned, the depression angle being an angle of the imaging devices fixed with respect to the vehicle; wherein the imaging devices are arranged such that the baseline vector connecting optical centers of the imaging devices is perpendicular to a normal vector that is normal to the plane, and optical axes of the imaging devices are non-parallel to each other.

7. The image processing apparatus according to claim 6, wherein the processing circuitry calibrates lens distortion in each of the captured images to obtain first calibrated images and carries out calibration to align corresponding positions of the first calibrated images with each other horizontally and to verticalize an object within the captured images with respect to the plane to obtain second calibrated images.

8. The image processing apparatus according to claim 7, wherein the processing circuitry virtually rotates the imaging devices to calibrate the object in each of the first calibrated images vertically with respect to the plane and carries out parallel movement in a vertical direction such that a horizontal position of an image of the first calibrated images becomes a horizontal position designated in advance.

9. The image processing apparatus according to claim 6, further comprising:
   a display that displays at least one of the calibrated images or a stereoscopic image based on the calibrated images.

10. An image processing apparatus installed on a vehicle, the image processing apparatus comprising:
    imaging devices that capture an overlapping region; and
    processing circuitry configured to calibrate captured images to obtain calibrated images in which lens distortion in each of the captured images is corrected and corresponding positions of the captured images are aligned with each other horizontally by performing a parallelization conversion such that epipolar lines in the captured images are horizontally aligned with each other to yield horizontally aligned captured images and the epipolar lines are adjusted to a surface perpendicular to a plane by virtually rotating, about an axis parallel to a baseline vector, the horizontally aligned captured images based on a depression angle such that optical axes of the imaging devices are horizontally aligned, the depression angle being an angle of the imaging devices fixed with respect to the vehicle; wherein the imaging devices are arranged such that the baseline vector connecting optical centers of the imaging devices is perpendicular to a normal vector that is normal to the plane, and optical axes of the imaging devices are in a position twisted from each other.

11. The image processing apparatus of claim 1, wherein the calibration to verticalize the object corresponds to a rotational transform represented by a rotation matrix.

12. The image processing apparatus of claim 1, wherein in verticalizing the object, the processing circuitry virtually rotates a whole of each of the horizontally aligned captured images.

* * * * *